United States Patent
Sowinski

Patent Number: 5,437,180
Date of Patent: Aug. 1, 1995

[54] DETECTION OF NATURAL GAS WITHIN A CUSTOMER'S DOMAIN

[76] Inventor: Richard F. Sowinski, 996 Arnold Dr., Martinez, Calif. 94553

[21] Appl. No.: 155,951

[22] Filed: Nov. 19, 1993

[51] Int. Cl.[6] .............................................. G01L 27/00
[52] U.S. Cl. .................................... 73/40.5 R; 73/780
[58] Field of Search .......................... 73/40.5 R, 780

[56] References Cited

U.S. PATENT DOCUMENTS

| | | | |
|---|---|---|---|
| 4,604,899 | 8/1986 | Yamada et al. | 73/708 |
| 4,656,871 | 4/1987 | Czarnoski | 73/708 |
| 4,667,516 | 5/1987 | Shulz | 73/708 |
| 4,798,093 | 1/1989 | Kenoun | 73/708 |
| 5,050,423 | 9/1991 | Czarnoski | 73/4 R |
| 5,193,399 | 3/1993 | Czarnoski | 73/708 |

Primary Examiner—Richard E. Chilcot, Jr.
Assistant Examiner—R. L. Biegel
Attorney, Agent, or Firm—Harold D. Messner

[57] ABSTRACT

Temperature of the gas stream entering the end user's internal piping system has been found to be fairly stable (at about 50 degree F.) but still variable while the temperature of the end user's internal piping system (irrespective of total length) has been found to vary as a function of the ambient temperature exterior of the end user's internal piping system. Each of such temperatures can be used in association with a differential pressure leakage detection system that uses a piezoresistive pressure sensor which measures differential pressures between the natural gas and ambient air both entering the sensor to provide a pair of output signals with the difference between these signals being related to the occurrence of small leakage of natural gas within the internal piping network of the end-user, such flow being normalized so that any such flow is due only to leakage.

12 Claims, 3 Drawing Sheets

DETECTION OF NATURAL GAS WITHIN A CUSTOMER'S DOMAIN

SCOPE OF THE INVENTION

The present invention relates to a method of detection. More particularly, it relates to a method of detection of natural gas leakage within the domain of natural gas customer, say within the gas piping system owned by the customer, such system or network being found between the gas meter maintained and owned by the natural gas supplier and the appliances owned and operated by the gas customer. As a further constraint, the sources of such leakage of natural gas can be below the combustion levels but still be at sufficient levels to be a threat to human health. It is believed leakage occurs at rather high rates, say in a range of between 40 to 60 per cent of such end-user systems.

DEFINITIONS

In this Application, "natural gas" means a mixture of gases associated with hydrocarbon accumulation within the earth as well as processed fuel gases derived from petroleum as well as mineral products such as coal in either gas or liquid phases. In some gas line networks, the resulting final gases may be a mixture from these two sources but wherein the essential component consists of methane.

"Sufficient level to be a health threat" means a recognized standard for human health and safety established by authoritative bodies above which cancer or reproductive toxicity in humans results, such bodies to include but not be limited to the U.S. Environmental Protection Agency (EPA), the U.S. Department of Food and Drug Administration (FDA) and the U.S. Department of Commerce. The EPA has set health and safety standards for radon which, if exceeded, would pose a risk to human health.

"Adsorption" means filter media that captures molecules of gas, liquid or dissolved substance to the filter surface, by adhesion.

"Absorption" means filter media that absorbs molecules of a gas, liquid or dissolved substance to the filter itself, by taking in through pores or interstices.

"Impingement" means filter media that captures molecules of a gas, liquid, solid or a dissolved substance to the filter by physical capture such as by change in velocity.

BACKGROUND OF THE INVENTION

The danger of natural gas leakage is well documented. But monitoring of leakage of natural gas at a customer-end user's home, business and the like, except by using an odorant, is of low priority. Reason: dangers due to low concentrations of natural gas is not well-documented. However, as the age of the customer's piping networks increase, the frequency of low concentration leakage become large enough to be a sufficient threat to the health and safety of the user.

Also, in my copending application, Ser. No. 07/926,457 filed Aug. 8, 1992 for "METHOD AND MEANS FOR FILTERING ODORANT FROM A GAS STREAM", I teach that odorant such as mercaptan are sufficient threat to health to warrant their removal by the user within his own internal piping network and in the above application, are removed from the natural gas flow within a customer's domain by filtering. However, while newer customer piping systems may be sufficient to not require direct and active monitoring even if the odorant is filtered from the natural gas stream as I propose, older internal piping systems may require an active method of leakage detection under such circumstances. While EPA and various State Agencies may be aware of the problem of leakage in a customer's internal gas lines, they do not think the reported exposure is of sufficient levels or a large enough frequency, to be dangerous.

In such situation, I find that surprisingly large concentrations of leakage occur in older internal piping systems. Such systems are historically constructed of metal materials resulting in conventional black iron, galvanized and copper piping networks. I have found that an average internal piping network of a customer is 40–60 feet in length and comprises numerous fittings and lengths of piping attached together, say in the range of about 40 to 90 connections. With time, such joints can leak due to various conditions, such as corrosive nature of natural gas, temperature variation, mechanical stress due to aging of supporting structure and seismic ground movement.

The American Gas Association recommends minimum surveys—once a year in business districts and every 5 years outside business areas. These surveys are made by one of the following methods: manhole and bar hole surveys using combustible gas indicators, vegetation, pressure drop and visual surveys and mobile infrared surveys. However, within the customer's domain, only inaccurate and clumsy methods are available. For example, one method uses the gas meter itself. Its dial is checked under FLOW-NO FLOW conditions. Then an appliance is turned on and the meter re-checked. If the meter dial does not move, the meter is defective.

Another method uses a manometer attached to an appliance outlet. After calibration, FLOW AND NO-FLOW conditions are observed. If the latter conditions result in a pressure drop reading, all outlets in the stream should be examined for leakage.

However, at present there is no on-line method to detect gas leakage within the end user's internal piping network.

SUMMARY OF THE INVENTION

The present invention relates to a method of active (in-line) detection of leaking natural gas within the piping network that is the domain of the end-user, viz., at his home, business or the like which is connected to an adjacent gas distribution and processing system through the end user's meter.

In accordance with the invention, the temperature of the gas stream entering the end user's internal piping system has been found to be fairly stable (at about 50 degree F.) but still variable while the temperature of the end user's internal piping system (irrespective of total length) has been found to vary as a function of the ambient temperature exterior of the end user's internal piping system. Each of such temperatures can be used in association with a differential pressure sensing and conditioning circuit that uses a piezoresistive pressure sensor which measures differential pressures between the natural gas and ambient entering the transducer to provide a pair of output signals, wherein the conditioned difference between these signals is related to the magnitude of leakage flow of the natural gas based on sensed temperature changes at measured by first and second thermistors. In such a sensor, there is provided four piezoresistive elements in or on a flexible diaphragm (see U.S. Pat. No. 5,184,107 for "PIEZORESISTIVE PRESSURE TRANSDUCER WITH A CONDUCTIVE ELASTOMERIC SEAL"; U.S. Pat. No. 4,667,516 for "CIRCUIT ARRANGEMENT FOR COMPENSATING FOR THE TEMPERATURE DEPENDENCE OF THE SENSITIVITY AND THE NULL POINT OF A PIEZORESISTIVE PRESSURE SENSOR" and U.S. Pat. No. 4,788,521 for "TEMPERATURE COMPENSATION SYSTEM FOR PIEZORESISTIVE PRESSURE SENSOR"), Two ports are provided to provide ambient and gas samples. When the diaphragm is flexed because of differential pressure, a stress is placed on the piezoresistive elements, causing them to change resistance. The resistance of such elements at any one time, is an accurate indication of differential pressure. But since both the resistance of the piezoresistive elements and its sensitivity to change as a function of stress, are dependent on temperature, there is a need to generate a temperature dependent correction voltage to adjust the differential signal for changes in temperature. That is, in an adjustment circuit, the sensor signal is adjusted to provide a desired output signal that takes into account the temperatures of the gas stream and the temperature of the metal mass of the piping system of the end-user, such temperatures being introduced to the adjustment circuit via the first and second thermistors. Such desired output signal has also been found to be surprisingly indicative of small leakage of natural gas from the gas network being monitored since such leakage are associated with rapid temperature change with time. The final process signal is then further conditioned and used to drive the inverting input of an operational amplifier operating as a conventional comparator, such amplifier having its non-inverting input connected to ground through a voltage divider to establish a set point level whereby of the inverting signal is below the set point level, the output of amplifier goes HI to drive a visual, audio or other type of alarm circuit to alert the end-user of leakage of natural gas within his piping system. Such alarm circuits are conventional in the art. Accordingly, the present invention provides an highly accurate leakage detection method, such method taking into account temperature variations within the gas stream and exterior of the end user's internal piping system. Note that such detection method occurs after the gas stream has been introduced into the end-user's piping system through the gas meter and after the gas stream has been filtered to remove all substances that pose a health hazard to the user, including but not limited to conventional gas odorant. That is, the detection system of the invention is downstream of the user's meter and a gas filtering system as previously taught in the patents cited above, such detection system providing an active indication of leakage within the customer's piping system or network when his appliances are in the NO-FLOW condition whereby the set point level of the comparator circuit is established.

DESCRIPTION OF A PREFERRED EMBODIMENT

Figure 1:
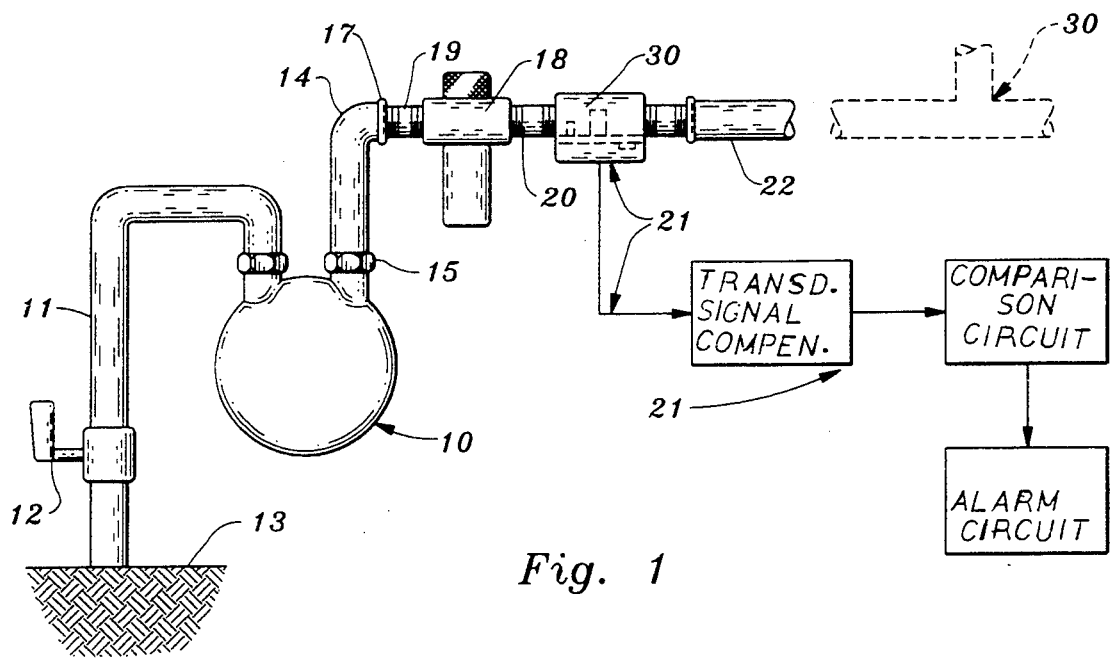
FIG. 1 is a side view of the leakage detection system of the present invention positioned within the end user's internal piping system adjacent to a filtering assembly.

FIG. 1 illustrates a gas meter 10 connected via upright gas pipe 11 and ON-OFF valve 12 to a main gas line network (not shown) located downstream of the meter 10 below the earth's surface 13. Upstream of the meter 10 is a elbow 14 having a first end 15 connected to the meter 10 and a second end 17 connected to filter assembly 18 through a fitting 19. The filter assembly 18 in turn connects via outlet fitting 20 to a leak detection system 21. The leak detection circuit 21, in turn, connects to inlet pipe 22 of the end-user's internal piping system generally indicated at 23. In operation, when valve 12 is open, the filter assembly 18 and leak detection system 21 operate in tandem as described in detail below, but when the valve 12 is deactivated, the natural gas flow to the filter assembly 18 and the leak detection system 21 is interrupted. The purpose of stopping gas flow as described above: to service the filter assembly 10. However with interruption of the gas flow, the leak detection system 21 is also deactivated as explained below.

The filtering assembly 18 has been described with reference to the above-identified patents and such description is incorporated herein. Suffice it to say, the filtering assembly 18 provides a series of passageways through a canister that allow entry and egress of the gas stream through filtering media to filter out impurities including conventional gas odorant. As explained in the above-identified application, the filter media can includes pleated filter paper, silica gel in crystallin form, open pore polyurethane foam and granular activated charcoal. The characteristics of such filtering media will be in connection with filtering of gas odorant will be further briefly described here.

The filter paper has the following characteristics. It must be widely available, perform impingement, absorption and adsorption and be made by conventional manufacturing processes including but not limited to methods involving weaving of cellulose, wool, acrylic, rayon fibers into corrugated sheet form.

The silica gel is also made by conventional manufacturing processes for the purpose of absorbing moisture within the gas stream.

The open pore polyurethane foam is a matrix structure for the purpose of retaining micro vapors and solid particulate including oils and has the following characteristics. Shape: Cylindrical shape from sheet form; Density—0.1 to 0.4 g/cu. cm; Porosity—0.14 to 0.41 (i.e. 70% to 90% open pore polyurethane; Sampling Period—2 months AT 100 % retention; Preparation—Cut from foam sheets, air dry and install; and Pressure Drop—0.015 psi.

Figure 2:
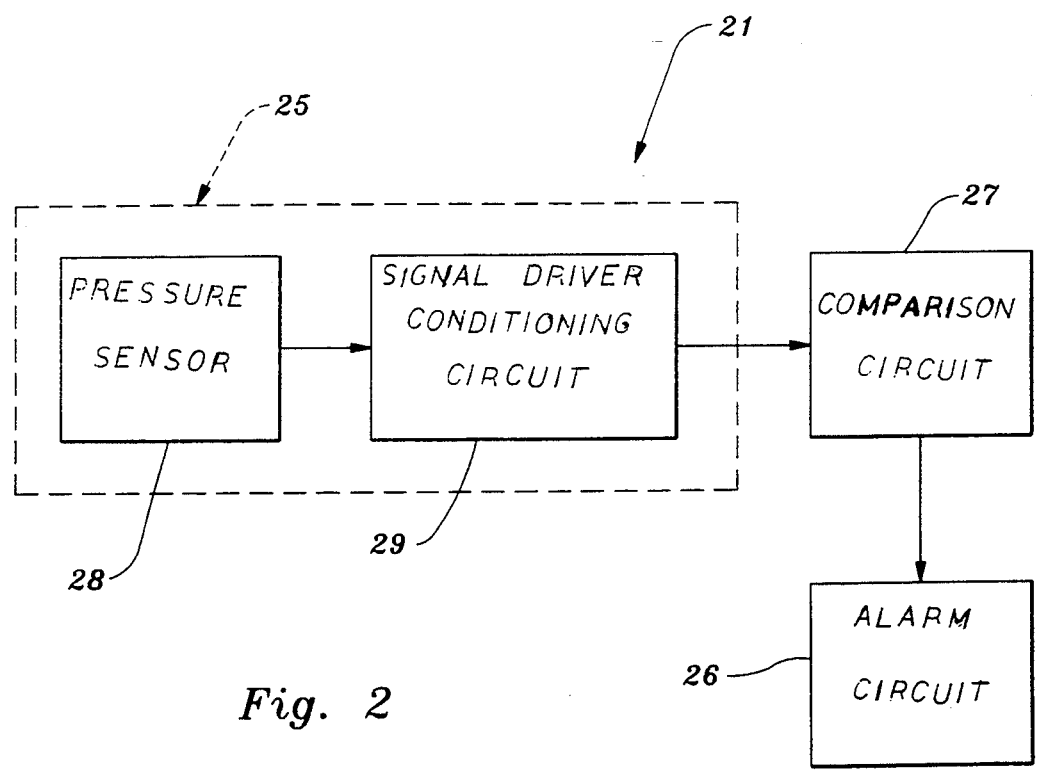
FIG. 2 is a schematic diagram of the leakage detection system of FIG. 1, such system including a pressure senor-transducer and signal compensating circuit connected to an alarm circuit through a comparator circuit.
Figure 3:
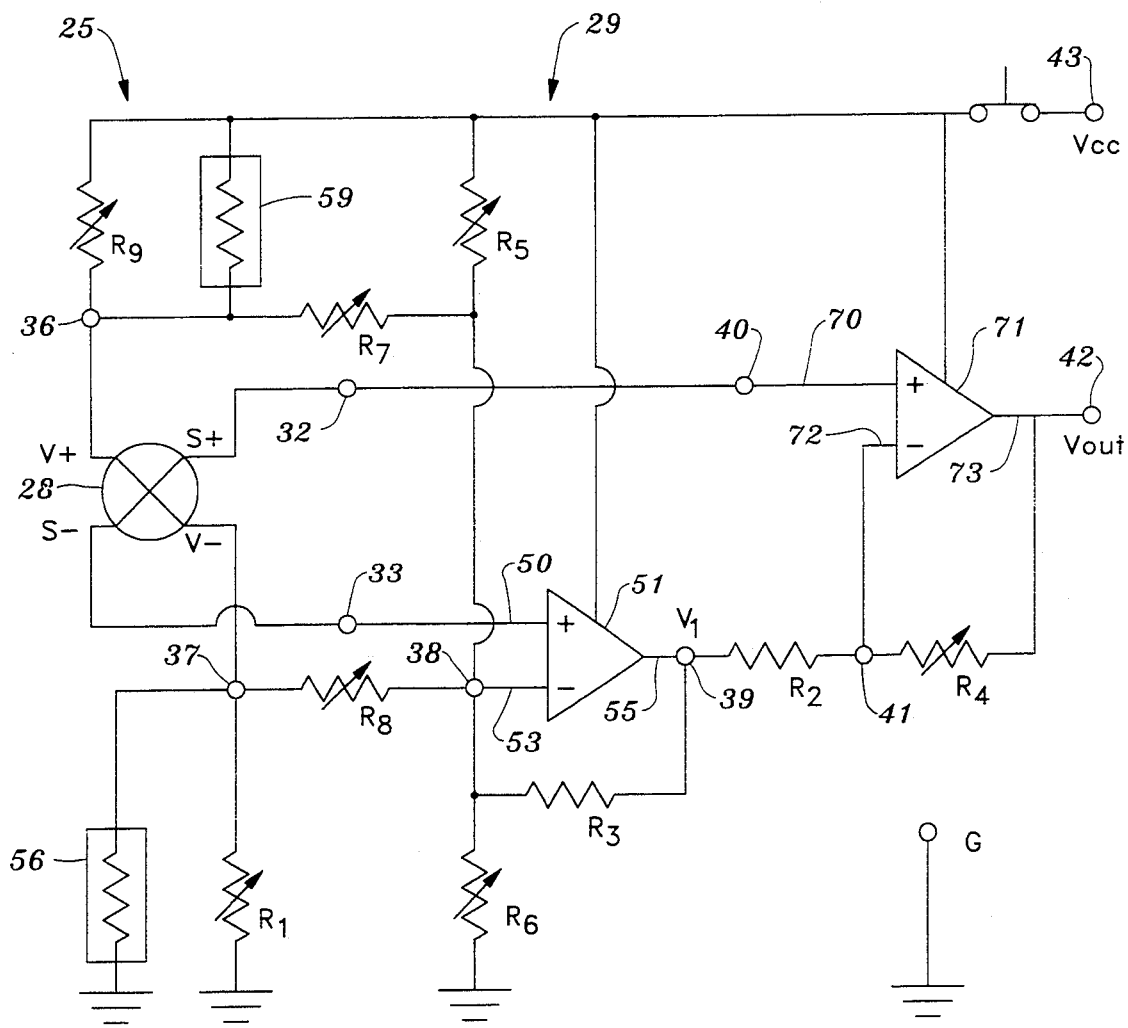
FIG. 3 is a schematic circuit diagram of the pressure senor-transducer and signal compensating circuit of FIG. 2.
Figure 4:
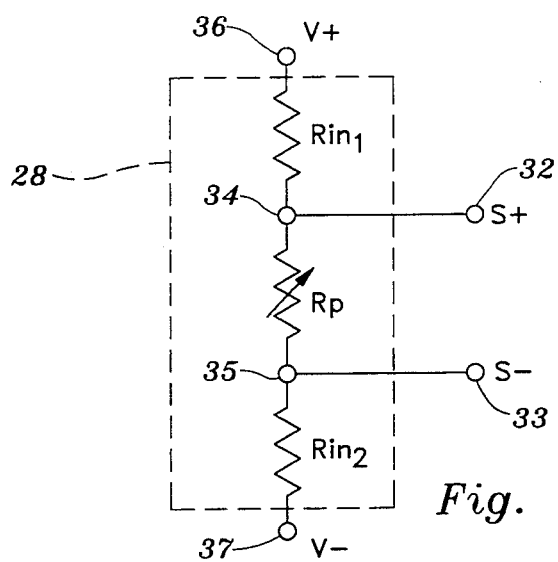
FIG. 4 is a schematic diagram of an equivalent circuit for the pressure senor-transducer and signal compensating circuit, FIG. 3.

The activated charcoal performs filtering on liquids, gases and solid particulate down to 10 Angstroms in size (but does not retain water) by impingement and adsorption and is prepared by carbonization of raw materials such as wood, coconut shell and coal. It attracts and holds contaminants including odorant irrespective of the mode of transport such as a liquid or gas alone or piggyback aboard dirt and dust particles as well as with liquid plugs. It has the following characteristics: Surface Area=600 to 1050 cubic meters per gm; Density=0.92 to 2.0 grams per cubic meter; Effective size=0.8 to 1.5mm; Pore volume=0.6 to 1.7 cubic cm per gram; Mean diameter=1.2 to 1.7 mm; Sieve Size=No. 8 to No. 40 (U.S. Series); Iodine No.=650 to 1,000 ;

FIGS. 2, 3 and 4 illustrate the leakage detection system 21 of the invention in more detail.

As shown in FIG. 2, the system 21 includes a pressure senor-transducer and signal compensating circuit generally indicated at 25 connected to an alarm circuit 26 through a comparator circuit 27. As indicated below, the pressure sensor and signal compensating circuit 25 includes a pressure sensor 28 operationally connected to a signal driving and conditioning circuit 29. Each of the above circuits will be now described in detail.

FIG. 3 shows the pressure sensor 28 and the driving and conditioning circuit 29 of the pressure sensor transducer and signal compensating circuit 25 in more detail.

As shown the pressure sensor and signal compensating circuit 25 includes pressure sensor 28 for sensing differential pressure within a sensing pipe 30, see FIG. 1, through which is flowing natural gas and in response thereto providing a first sensor voltage signal S+ and a second voltage sensor signal S−. These signals S+ and S− appear at first and second output terminals 32 and 33, respectively. The differential voltage between S+ and S− , is directly related to sensed differential pressure within the sensing pipe 30 of FIG. 1 as explained below.

Preferably, the sensor 28 is a piezoresistive pressure sensor. FIG. 4 illustrates a typical equivalent circuit thereof. As shown, the sensor 28 is seen to be equivalent to a pressure variable resistor Rp connected in series with non-pressure variable resistors Rin1 and Rin2. The resistor Rp is seen to be located between terminals 34 and 35 which, in turn, are coupled to output terminal 32, 33, respectively, where the signals S+ and S− appear and across which differentially applied voltage of V+ and V− is applied via terminals 36, 37. It should be noted that while a series equivalent circuit for the sensor 31 is illustrated in FIG. 4, another schematic illustrations would be a bridge configuration. In such a bridge circuit a pressure independent resistor is connected with a pressure variable resistor with a voltage differential of V+ and V− being applied across the bridge then provides a differential output of S+ and S− across output terminals 32, 33. Regardless of which equivalent circuit is utilized to depict the pressure sensor 28, the operation of the driving and conditioning circuit 29 of the pressure sensor transducer and signal compensating circuit 25 is identical. Again referring to FIG. 3, the sensor voltage signal S− is directly connected to a non-inverting input 50 of a first operation amplifier 51. The terminal 37 at which the applied voltage V− is provided, is connected through an adjustable resistor R8 to a terminal 38 which, in turn, is coupled to inverting input 53 of operational amplifier 51. Output 55 of the amplifier 51 connects to terminal 39 which is also connected through a negative feedback resistor R3 to terminal 38 and through a resistor R2 to a terminal 41. The signal from the operational amplifier 51 appearing at output 55 and terminal 39 is designated V1 to indicated that this is an intermediate voltage signal, such signal V1 being directly related to the sensor output voltage signal S−. Terminal 38 is connected to ground through a variable resistor R6 and, in addition, is connected to a positive source of fixed voltage potential Vcc via terminal 43 through a variable resistor R5 and a switch 48. The switch 48 that is located adjacent to terminal 43, provides ON-OFF conditions for the circuit 25. The terminal 37 is connected to ground through the parallel combination of an adjustable resistor R1 and negative temperature coefficient thermistor 56. The terminal 36 is connected to the terminal 38 through a variable resistor R7 and is connected to the terminal 43 through the parallel combination of a variable resistor R9 and a positive temperature coefficient thermistor 59.

Figure 5:
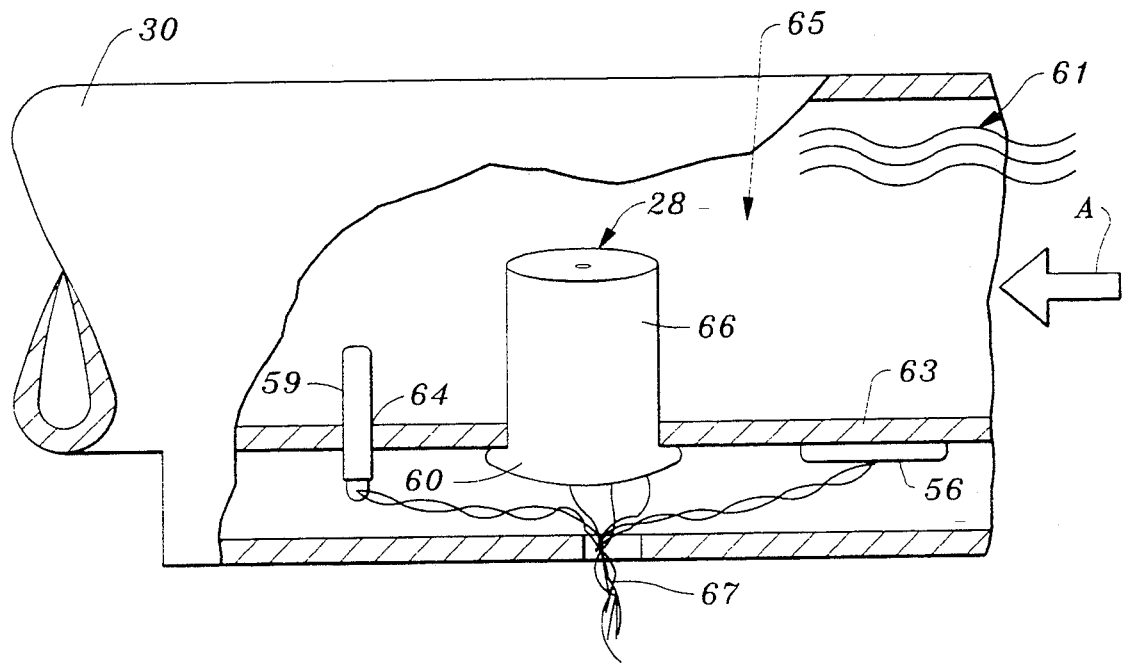
FIG. 5 is a detail side view of a gas pipe of the internal piping system of FIG. 1 illustrating the positioning of selected elements of the circuit of FIG. 3 therein.

FIG. 5 illustrates the positioning of the negative and positive temperature coefficient thermistors 56, 59 relative to sensing pipe 30 carrying natural gas generally indicated at 61. As shown, thermistor 56 attaches to side wall 63 of the pipe 60, while thermistor 59 extend through opening 64 in the side wall 63 and terminate within cavity 65 of the pipe 30. In that way, thermistor 56 is responsive to the temperature of the end-user's piping system and the thermistor 59 is responsive to the temperature of the natural gas 61.

In addition, in FIG. 5 note that sensor 28 includes elongated cylindrical housing 66 that has a central entryway 66a in pressure contact with the natural gas that flows in the direction of arrow A. Such entryway 66a permits gas to enter on one side of the diaphragm (not shown) housed within dome 60 the exterior of the side wall 63 of the sensing pipe 30. A second opening (not shown) at the exterior of the pipe 30 allows ambient pressure to contact the diaphragm on an opposite side whereby differential pressure between the natural gas 61 and the ambient air is determined. Wiring harness 67 couples the thermistors 56, 59 and the sensor 28 to the remaining circuit elements of the driving and conditioning circuit 29 of the pressure sensor transducer and signal compensating circuit 25 of FIG. 3.

Returning to FIG. 3, note that the sensor output signal S+ appearing at terminal 32 is connected to a terminal 40 and thence to non-inverting input 70 of a second operational amplifier 71 which has an inverting input 72 directly connected to the terminal 41. Output 73 of the amplifier 71 is seen to connect to terminal 42 and to variable feedback resistor R4 and thence to the terminal 41. The signal at the terminal 42 is designated as Vout and has been provided with a desired pressure and temperature variation characteristic that takes into account the operational and temperature variations within the environment of the sensor 28, and more specifically takes into account the fact that a low gas flows, say due to leakage provides a temperature variation within the thermistors 56, 59 which is reflected in such characteristic.

Note that the pressure transducer and signal compensating circuit 25 implements all needed signal adjustments as well as reflects small temperature changes due to small leaks from the piping system of the end-user, such that the output signal Vout has a desired pressure and temperature characteristics. That is, the resistor R9 and R1 associated with the operations of thermistor 56 are used to adjust the temperature coefficient of the span (gain). The resistors R7 and R8 also associated with the operation of the thermistor 59 are used to adjust the temperature coefficient of the offset for the output signal Vout due to any non-pressure related difference between the signals S+ and S−. This is referred to as the temperature coefficient offset adjustment. The variable resistor R4 is used to adjust the absolute value of the span or gain. The resistor R5 and R6 are used to adjust the absolute value of offset. Once such adjustments—as noted above—in resistance levels are occurred, it has been found that ultra-low levels of gas flows can be indicated by small changes in the output of thermistors 56, 57 due to changes in measured temperatures.

Note that the circuit 25 of FIG. 3 can be shown to define a transfer function that is represented by the equation:

$$V_{out} = \frac{R_4}{R_2}(S^+ - S^-) + S^+ - \frac{R_4}{R_2}\left(\frac{R_3}{R_5} + \frac{R_3}{R_6} + \frac{R_3}{R_7} + \frac{R_3}{R_8}\right)S^- + \frac{R_4}{R_2}\left(\frac{R_3}{R_7}V^+ + \frac{R_3}{R_8}V^-\right) \quad (1)$$

For a common mode gain of zero, the voltage Vout should only be a function of the difference between S+ and S−, since any equal shift of S+ and S− in the same direction should cancel out. Equation 1 illustrates for the circuit 25 to achieve a common mode voltage gain of zero, which is the desired condition, the following equality must be achieved since V+ and V− must not change significantly for the expected variations of S+ and S−:

$$1 = \frac{R_4}{R_2}\left(\frac{R_3}{R_5} + \frac{R_3}{R_6} + \frac{R_3}{R_7} + \frac{R_3}{R_8}\right) \quad (2)$$

Figure 6:
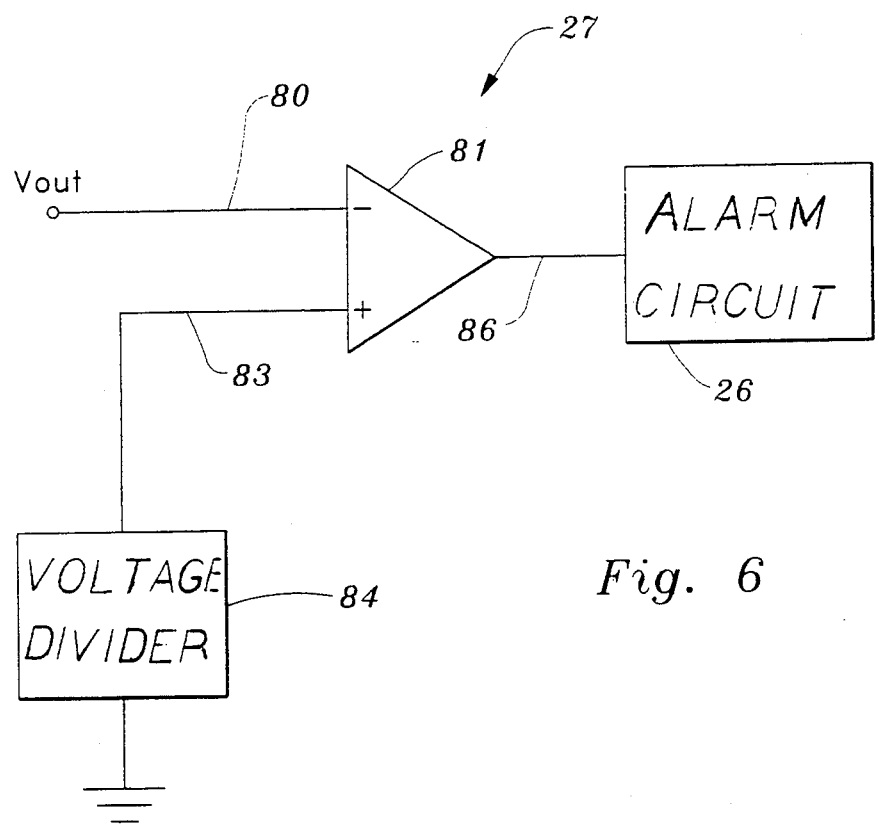
FIG. 6 is a schematic diagram of the comparator circuit of the leakage detections system of the invention.

FIG. 6 shows the comparator circuit 27 in more detail. The final process signal Vout is process by the circuit 27 as follows. The signal Vout is first conditioned to be a positive going signal and is then used to drive inverting input 80 of operational amplifier 81. The amplifier 81 is operating as a conventional comparator. Note that such amplifier 81 has an non-inverting input 83 connected to ground through a conventional voltage divider 84 to establish a set point level whereby when the inverting signal Vout at inverting input 80 of the amplifier 81 is below the set point level, output 86 of the amplifier 81 goes HI to drive conventional alarm circuit 26 which can be a visual, audio or other type of alarm circuit to alert the end-user of leakage of natural gas within his internal piping system. That is, since the alarm circuit 26 is conventional in the art, its descriptions will be dispensed with here.

The above description contains several specific embodiments of the invention. It is not intended that such be construed as limitations on the scope of the invention, but merely as examples of preferred embodiments. Persons skilled in the art can envision other obvious possible variations within the scope of the description. For example, a current output signal rather than a voltage output signal Vout can be used, such current signal retaining the basic principes disclosed and claimed herein. Hence the scope of the invention is to be determined by the appended claims and their legal equivalents.

What is claimed is:

1. A sensor circuit for measuring leakage in a natural gas pipe, comprising a pressure resistive sensor for sensing differential pressure within a natural gas pipe by generating first and second signals wherein a differential signal thereof is an output signal which relates the magnitude of sensed differential pressure of said natural gas and ambient air, pressure resistive sensor comprising a piezoresistive pressure sensor, an adjustment circuit connected to said pressure resistive sensor for receiving said first and second signals and providing said output signal having a desired magnitude variation characteristic as a function of pressure and temperature as well as indicating small leakages of gas from said natural gas pipe, said adjustment circuit including resistive means for adjusting (i) span of said output signal as a function of differential pressure, (ii) absolute offset of said output signal with respect to said first and second signals and (iii) temperature dependent resistive coefficient of variation of both of said offset and said span based on measured temperatures of both natural gas within a natural gas pipe and said gas pipe itself, said temperature dependent resistive coefficient of variation also indicative of small leakage of natural gas from said natural gas pipe within an end-user's domain, said adjustment circuit also including first and second operational amplifiers, said first operational amplifier having a non-inverting input coupled to said sensor, an inverting input and an output, said second operational amplifier having an inverting input coupled to said output of said first operational amplifier, an non-inverting input and an output on which said pressure related output signal is generated, said adjustment circuit further including first offset adjustment resistor means connected to said inverting input of said second operational amplifier, said adjustment circuit still further including temperature sensitive resistor means connected to said inverting input of said first operational amplifier, said temperature sensitive resistor means including first and second thermistors each in series with said inverting input, said first and second thermistors having resistive coefficients of variation that are based on measured temperatures of both natural gas within a natural gas pipe and said gas pipe itself, as well as being indicative of the occurrence of small leakage of natural gas from said natural gas pipe within an end-user's domain.

2. The sensor circuit of claim 1 in which said first thermistor has a positive resistive coefficient of variation, and said second thermistor has a negative resistive coefficient of variation.

3. The sensor circuit of claim 2 with the addition of a comparator circuit connected to said output of said second operational amplifier, said comparator circuit comprising a third operational amplifier having an inverting input connected to said output of said second operational amplifier, an output, an non-inverting input, said comparator circuit also including a voltage divider having a fist terminal connection to said non-inverting input of said third operational amplifier and a second terminal connect to ground to establish a set point level whereby a response signal at said inverting input of said third operational amplifier below a set point level, generates a HI output at said output of said third operational amplifier.

4. The sensor circuit of claim 3 with the addition of an alarm circuit coupled to said output of said third operational amplifier to alert the end-user of leakage of natural gas within said gas pipe.

5. In a sensor circuit for measuring leakage in a natural gas pipe, the combination comprising
   a natural gas pipe having a side wall and a cavity therein for carrying natural gas,
   a pressure resistive sensor for sensing differential pressure within said natural gas pipe by generating first and second signals wherein a differential signal thereof is an output signal which relates the magnitude of sensed differential pressure of said natural gas and ambient air,
   an adjustment circuit connected to said pressure resistive sensor for receiving said first and second signals and providing said output signal having a desired magnitude variation characteristic as a function of pressure and temperature as well as indicating small leakages of gas from said natural gas pipe,
   said adjustment circuit including resistive means for adjusting (i) span of said output signals as a function of differential pressure, (ii) absolute offset of said output signal with respect to said first and second signals and (iii) temperature dependent resistive coefficient of variation of both of said offset and said span based on measured temperatures of both natural gas within a natural gas pipe and said gas pipe itself, said temperature dependent resistive coefficient of variation also indicative of small leakage of natural gas from said natural gas pipe within an end-user's domain.

6. The combination of claim 5 in which said adjustment circuit includes first and second operational amplifiers, said first operational amplifier having a non-inverting input coupled to said sensor, an inverting input and an output, said second operational amplifier having an inverting input coupled to said output of said first operational amplifier, an non-inverting input and an output on which said pressure related output signal is generated.

7. The combination of claim 6 in which said adjustment circuit includes first offset adjustment resistor means connected to said inverting input of said second operational amplifier.

8. The combination of claim 7 in which said pressure resistive sensor comprise a piezoresistive pressure sensor.

9. The combination of claim 8 in which said adjustment circuit includes temperature sensitive resistor means connected to said inverting input of said first operational amplifier, said temperature sensitive resistor means including first and second thermistors, each being in series with said inverting input, said first and second thermistors having resistive coefficients of variation that are based on measured temperatures of both natural gas within a natural gas pipe and said gas pipe itself as well as being indicative of the occurrence of small leakage of natural gas from said natural gas pipe within an end-user's domain.

10. The combination of claim 9 in which said first thermistor has a positive resistive coefficient of variation and attaches exterior of but in contact with said natural gas pipe, and said second thermistor has a negative resistive coefficients of variation and extends interior of said natural gas pipe to indicate temperature of said gas.

11. The combination of claim 10 with the addition of a comparator circuit connected to said output of said second operational amplifier, said comparator circuit comprising a third operational amplifier having an inverting input connected to said output of said second operational amplifier, an output, an non-inverting input, said comparator circuit also including a voltage divider having a first terminal connection to said non-inverting input of said third operational amplifier and a second terminal connect to ground to establish a set point level whereby a response signal at said inverting input of said third operational amplifier below a set point level, generates a HI output at said output of said third operational amplifier.

12. The combination of claim 11 with the addition of an alarm circuit coupled to said output of said third operational amplifier to alert the end-user of leakage of natural gas within said gas pipe.

* * * * *